June 24, 1930.  M. G. S. GRIFFITH  1,767,447
PROTECTIVE DEVICE FOR THE TONNEAU OF MOTOR CARS AND FOR OTHER PURPOSES
Filed Oct. 17, 1927
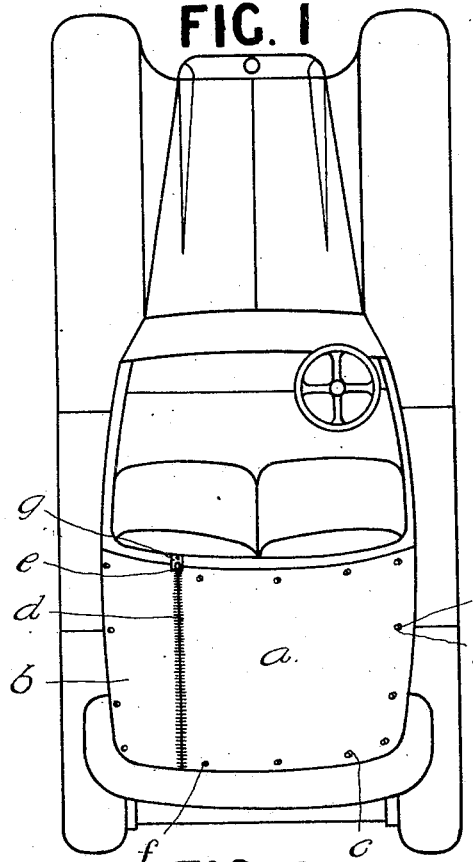
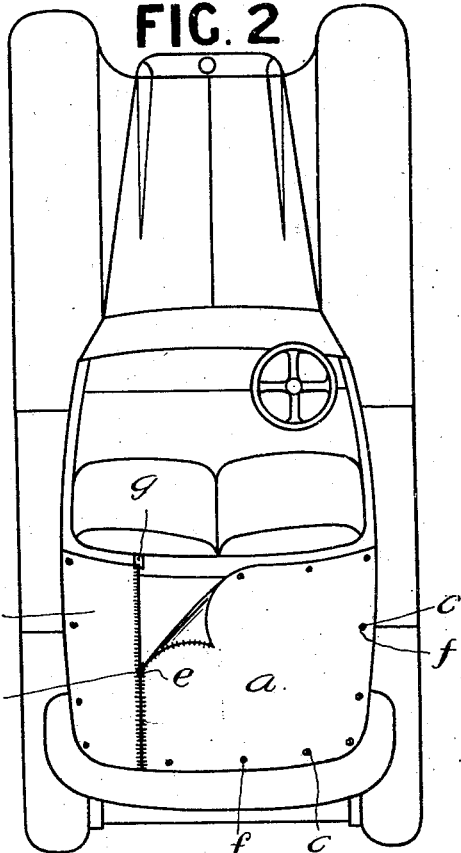
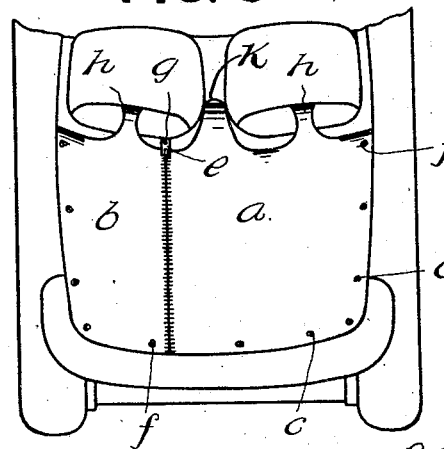
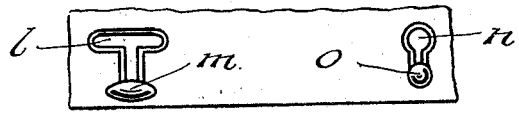
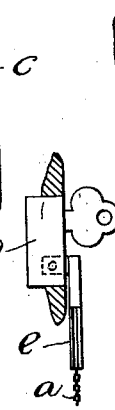
INVENTOR.
M. G. S. GRIFFITH.
By Fetherstonhaugh & Co.
ATTYS.

Patented June 24, 1930

1,767,447

UNITED STATES PATENT OFFICE

MARTHA GERTRUDE SARAH GRIFFITH, OF DUDLEY, ENGLAND

PROTECTIVE DEVICE FOR THE TONNEAU OF MOTOR CARS AND FOR OTHER PURPOSES

Application filed October 17, 1927, Serial No. 226,734, and in Great Britain March 24, 1927.

This invention relates to a new or improved protective covering device adapted for use in protecting or covering any space or receptacle for which a covering of flexible material is suitable.

For example the back or tonneau of a four-seater touring car is sometimes provided with a covering of waterproof and dust-proof fabric which is fitted when the rear-seats are not in use and keeps out dust and rain. The covering is, however, easily removed by any person and affords no protection against theft of articles left in the car.

The object of my invention is to provide an improved form of flexible cover which can be readily fitted or removed, but when fitted can be locked against removal so that no unauthorized person can obtain access to the space below the cover.

My invention is equally applicable to river craft and motor-boats, perambulators, shop blinds, delivery boxes or baskets and various other articles wherever a flexible covering can be employed.

Another object of my invention is to provide a flexible covering formed in two parts adapted to be connected together along their meeting edges by a strip fastening of known type operated by a sliding member. Each part of the covering is connected to the peripheral walls of the space to be covered by means of T or like slots in the covering fitted over headed studs on the walls. All of the slots in one part of the cover face in one direction and those in the other part face in the opposite direction, so that when the two parts are secured together the studs lie in the narrow ends of the slots and the cover cannot be lifted off the studs. The sliding member of the fastening means is then locked by any suitable means such as a padlock connecting it to a fixed staple and any articles below the cover are protected against theft.

The cover may be made of fabric, leather, or any other suitable flexible material.

If desired the headed studs may be arranged on the cover and the slots in the walls of the space which it is desired to cover.

Some practical forms of my invention as applied to a cover for the tonneau of a car are illustrated as examples in the accompanying drawings in which:

Figure 1 is a plan view of a car having a fixed front seat and fitted with my improved cover for the tonneau.

Figure 2 is a similar view with the cover partially opened.

Figure 3 is a similar view showing the cover applied to a car having separate front seats.

Figure 4 is a detail view showing two forms of eyelet and stud for the cover.

Figures 5 and 6 are detail sections showing the two forms of stud and eyelet.

Figure 7 is a detail section showing the means for locking the sliding member of the fastening means in place.

In the form shown in Figure 1 the cover consists of two parts $a$ and $b$ each formed of suitable waterproof fabric and each provided with eyelets $c$ of keyhole outline around three sides. The remaining side of each part which co-operates with the complementary side of the other part is fitted with a strip fastening $d$ of known type operated by a sliding member $e$. The narrow ends of the eyelet slots in each part of the covering are directed away from the fastening, so that when the eyelets are fitted over headed studs $f$ on the body work of the car around the tonneau and the two parts of the cover are secured together by the fastening, the studs lie in the narrow ends of the slots and the cover cannot be lifted off. The sliding member $e$ for the fastening is adapted to be locked in any desired manner to prevent it being opened by any unauthorized person. In the form illustrated the member $e$ has a notched peg or staple entering an opening in a key-operated lock $g$ mounted in the back of the front seat and adapted to be locked therein by a sliding plate in the manner of the usual attaché-case lock. Alternatively the member $e$ may be secured by a padlock to a fixed staple.

The two parts $a$ and $b$ of the covering are shown of unequal width so that the joint made by the sliding fastener is adjacent to one side of the vehicle where it is readily accessible.

In the modification shown in Figure 3, where the cover is applied to a car having separate front seats, each part of the covering has at its front end a strap $h$ which is taken down over the squabs and secured by a stud and socket fastener below the seat. A further strap $k$ closes the space between the seats and is detachably secured to the floor of the front compartment.

The studs and eyelets for securing the covering may be of any convenient type such as the T slotted eyelet $l$ and stud $m$ with elongated head as shown on the left of Figure 4 and in Figure 5. An alternative form of key-hole slotted eyelet $n$ and round-headed stud $o$ are shown on the right of Figure 4 and in Figure 6.

Where my invention is applied to shop blinds, or to blinds or covers for show-cases in shops, museums, or the like, the headed studs would be arranged round the periphery of the window frame or around the frame of the case, and the cover would be formed in two parts connected by a strip fastening in a similar manner to the form described with reference to Figures 1 and 2 of the accompanying drawings.

I claim:—

1. A protective device comprising a multipart flexible covering, a strip fastening to connect the parts along their meeting edges, a sliding member to operate the said strip fastening, means for locking the said sliding member when the fastening is closed, and means for detachably securing the covering to the peripheral walls of the space to be covered with means comprising co-operating parts on the walls and covering which are held against disconnection when the strip fastening is closed.

2. A protective device comprising a two-part flexible covering, a strip fastening to connect the parts along their meeting edges, a sliding member to operate the said strip fastening, means for locking the said sliding member when the fastener is closed, and securing means for the cover consisting of headed studs and eyelets engaged by the studs, the eyelets having slots with entrance and retaining portions.

3. A protective device comprising a two-part flexible covering, a strip fastening to connect the parts along their meeting edges, a sliding member to operate the said strip fastening, means for locking the said sliding member when the fastener is closed, and securing means for the cover consisting of headed studs, and eyelets engaged by the studs, the eyelets having slots with entrance and retaining portions and the headed studs being held in the retaining portions of the slots when the fastening is closed to prevent disconnection of these parts.

4. A protective device comprising a two-part flexible covering, a strip fastening to connect the parts along their meeting edges, a sliding member to operate the said strip fastening, a locking means for securing the sliding member to a fixed part adjacent to the position occupied by the sliding member when the fastening is closed, and means for detachably securing the covering to the peripheral walls of the space to be covered, said means comprising co-operating parts on the walls and covering which are held against disconnection when the sliding member is locked in the closed position.

5. A protective device comprising a two-part flexible covering, a strip fastening to connect the parts along their meeting edges, a sliding member to operate the said strip fastening, a catch member on said sliding member, locking means for securing the catch member to a fixed part adjacent to the position occupied by the sliding member when the fastening is closed, and securing means for the cover consisting of headed studs and eyelets engaged by the studs, the eyelets having slots with entrance and retaining portions and the headed studs being held in the retaining portions of the slot when the fastening is closed to prevent disconnection of these parts.

In testimony whereof I affix my signature.

MARTHA GERTRUDE SARAH GRIFFITH.